United States Patent [19]

Kitamura

[11] Patent Number: 5,335,086
[45] Date of Patent: Aug. 2, 1994

[54] METHOD OF AND APPARATUS FOR ELIMINATING PIN HOLES

[75] Inventor: Hideaki Kitamura, Kyoto, Japan

[73] Assignee: Dainippon Screen Mfg. Co., Ltd, Japan

[21] Appl. No.: 795,971

[22] Filed: Nov. 22, 1991

[30] Foreign Application Priority Data

Nov. 22, 1990 [JP] Japan .................................. 2-320194

[51] Int. Cl.⁵ .......................... G06K 9/40; H04N 1/419
[52] U.S. Cl. ....................................... 358/431; 382/54; 358/447; 358/261.1
[58] Field of Search ............... 382/54; 358/261.1, 431, 358/445, 447, 363

[56] References Cited

U.S. PATENT DOCUMENTS

| | | | |
|---|---|---|---|
| 4,389,677 | 6/1983 | Rushby et al. ...................... | 358/463 |
| 4,751,643 | 6/1988 | Lorensen et al. . | |
| 4,847,689 | 7/1989 | Yamamoto et al. ................... | 358/80 |
| 5,153,748 | 10/1992 | Moyer ................................... | 382/54 |
| 5,220,616 | 6/1993 | Downing et al. ..................... | 382/54 |

FOREIGN PATENT DOCUMENTS

| | | | |
|---|---|---|---|
| 0194689 | 3/1986 | European Pat. Off. . | |
| 0125478 | 7/1984 | Japan .................................. | 382/54 |
| 0198992 | 9/1987 | Japan .................................. | 382/54 |
| 216478 | 9/1987 | Japan . | |

*Primary Examiner*—Edward L. Coles, Sr.
*Assistant Examiner*—Kimberly A. Williams
*Attorney, Agent, or Firm*—Ostrolenk, Faber, Gerb & Soffen

[57] ABSTRACT

A target region and a pin hole size are specified in a block copy image, which is divided into plural separate regions. The size of each separate region in the target region is calculated and compared with the pin hole size. The separate region smaller than the pin hole size is extracted as a possible pin hole area and filled with the color of its surrounding area, thereby the pin holes are eliminated.

18 Claims, 14 Drawing Sheets

$Zp = Wx \times Wy$

Fig. 7

Tsum    Zp = 100

| Dsc | Sum | Fov |
|---|---|---|
| 1 | 102 | 1 |
| 2 | 53 | 0 |
| 3 | 105 | 1 |
| 4 | 209 | 1 |
| 5 | 67 | 0 |
| 6 | 108 | 1 |
| 7 | 104 | 1 |
| 8 | 101 | 1 |
| 9 | 43 | 0 |
| 10 | 112 | 1 |
| 11 | 69 | 0 |

Fig. 10C

[grid figure with labels Ra, Rb, Rc, Rd]

Fig. 10D

[grid figure with labels Ra, Rb, Rc, Rd]

Fig. 11

IST

| $Ns(2) = Ns(4)$ |
| $Ns(5) = Ns(6)$ |

METHOD OF AND APPARATUS FOR ELIMINATING PIN HOLES

BACKGROUND OF THE INVENTION

1. Industrial Field of the Invention

The present invention relates to a method of and an apparatus for eliminating pin holes in a block copy image, which includes characters, illustrations, logos or figures on a layout sheet, based on binary image data representing the block copy image.

2. Description of Related Art

A block copy is prepared as an original of characters and lineworks in prepress process for a color printing plate. The block copy is formed by arranging photo-type-setting characters and drafted keylines on a layout sheet in the same dimensions and quality as the final products. Instructions for the subsequent processes are also given on the layout sheet; that is, the layout sheet acts as an instruction paper of prepress process.

Tint laying is generally performed in prepress process. Tint laying is processing in which a specified region within an image is uniformly filled with a desired color. Automatic tint laying is employed in some of modern image processing systems. In such systems, tint laying is completed, for example, by obtaining binary image data of a block copy image with an image scanner and filling a certain closed region in the block copy image with a desired color with an image processor. In such a conventional image processing system, an image area is filled based on a low-resolution image which is read with the scanning resolution of approximately 400 dots per inch.

Recent technological innovation has allowed the image processing system to process image data of a large data volume at a high speed. In prepress and printing, there has been a strong need for an improved apparatus which will lay tint on binary image data of a large data volume obtained at a resolution of approximately 2,000 dots per inch.

A binary image read by an image scanner often includes pin holes which are small black dots in a white area of the binary image or otherwise small white dots in a black area. Pin holes constitute a noise in a binary image and are to be eliminated for improving the quality of the image.

Such pin holes are manually eliminated one by one; an operator thoroughly checks an image displayed on a CRT (cathode ray tube) for pin holes and fills each pin hole with the color of the surrounding area. This manual processing requires a lot of time especially for an image including a large number of pin holes.

An image of a high resolution usually includes smaller sizes of and a larger number of pin holes than the image of a low resolution. A lot of time is thus required for eliminating all the pin holes in an image of a high resolution.

European Patent Application 0 194 689 to Petrick et al. discloses a method and apparatus for removing undesirable dots and voids from bit-map images by scanning the image with a window element. The size of the window element is determined by the user according to the smallest data item of a bit-map image being scanned. The data levels of the window element's outer ring are examined to determine if the levels are the same for each pixel in the outer ring. If they are, the data levels of the interior of the window are set to equal values, thus eliminating the dots or voids. However, this method of eliminating dots and voids is complex and often inaccurate.

SUMMARY OF THE INVENTION

An object of the present invention is to eliminate a pin hole in an image with ease by a simple process.

The present invention is directed to a method of eliminating a pin hole in a linework image by processing image data of the linework image. The method comprises the steps of: (a) specifying a pin hole size; (b) dividing the linework image into plural separate regions; (c) calculating the size of each separate region; (d) comparing the size of each separate region with the pin hole size to find a separate region smaller than the pin hole size as a possible pin hole area; and (e) filling the possible pin hole area with a color of a separate region surrounding the possible pin hole area.

According to an aspect of the present invention, the step (e) comprises the steps of: (e-1) filling the possible pin hole area with a specific color distinct from colors of the other separate regions, and displaying the linework image on display means; (e-2) determining whether or not the possible pin hole area is to be filled with the color of the surrounding separate region; and (e-3) filling the possible pin hole area with the color of the surrounding separate region according to the determination at the step (e-2).

According to another aspect of the present invention, the step (c) comprises the step of: (c-1) counting the number of pixels in each separate region.

According to still another aspect of the present invention, the image data comprises run length data representing the linework image, and the step (c-1) comprises the step of accumulating run length of each separate region to obtain the number of pixels.

Preferably, the step of filling the possible pin hole area comprises the step of changing color data in the run length data representing each possible pin hole area to have a value representing the color of the surrounding separate region.

In the preferred embodiment, the method comprises the step of: (f) displaying the linework image on a display means, and specifying a subject region to be processed in the linework image displayed on the display means prior to the step (b).

The present invention is also directed to an apparatus for eliminating a pin hole in a linework image by processing image data of the linework image, comprising: display means for displaying the linework image; input means for specifying a pin hole size; dividing means for dividing the linework image into plural separate regions; computation means for calculating the size of each separate region; comparing means for comparing the size of each separate region with the pin hole size to find a separate region smaller than the pin hole size as a possible pin hole area; and filling means for filling the possible pin hole area with a color of a separate region surrounding the possible pin hole area.

These and other objects, features, aspects and advantages of the present invention will become more apparent from the following detailed description of the present invention when taken in conjunction with the accompanying drawings.

BRIEF DESCRIPTION OF TEE DRAWINGS

FIG. 7 is a conceptive view showing a summation table used in determination of area size;

FIGS. 10A through 10D are explanatory views showing steps of region segmentation;

FIG. 11 is a view showing an identical system color table; and

DETAILED DESCRIPTION OF THE PREFERRED EMBODIMENT

A. Structure of Apparatus

Figure 1:
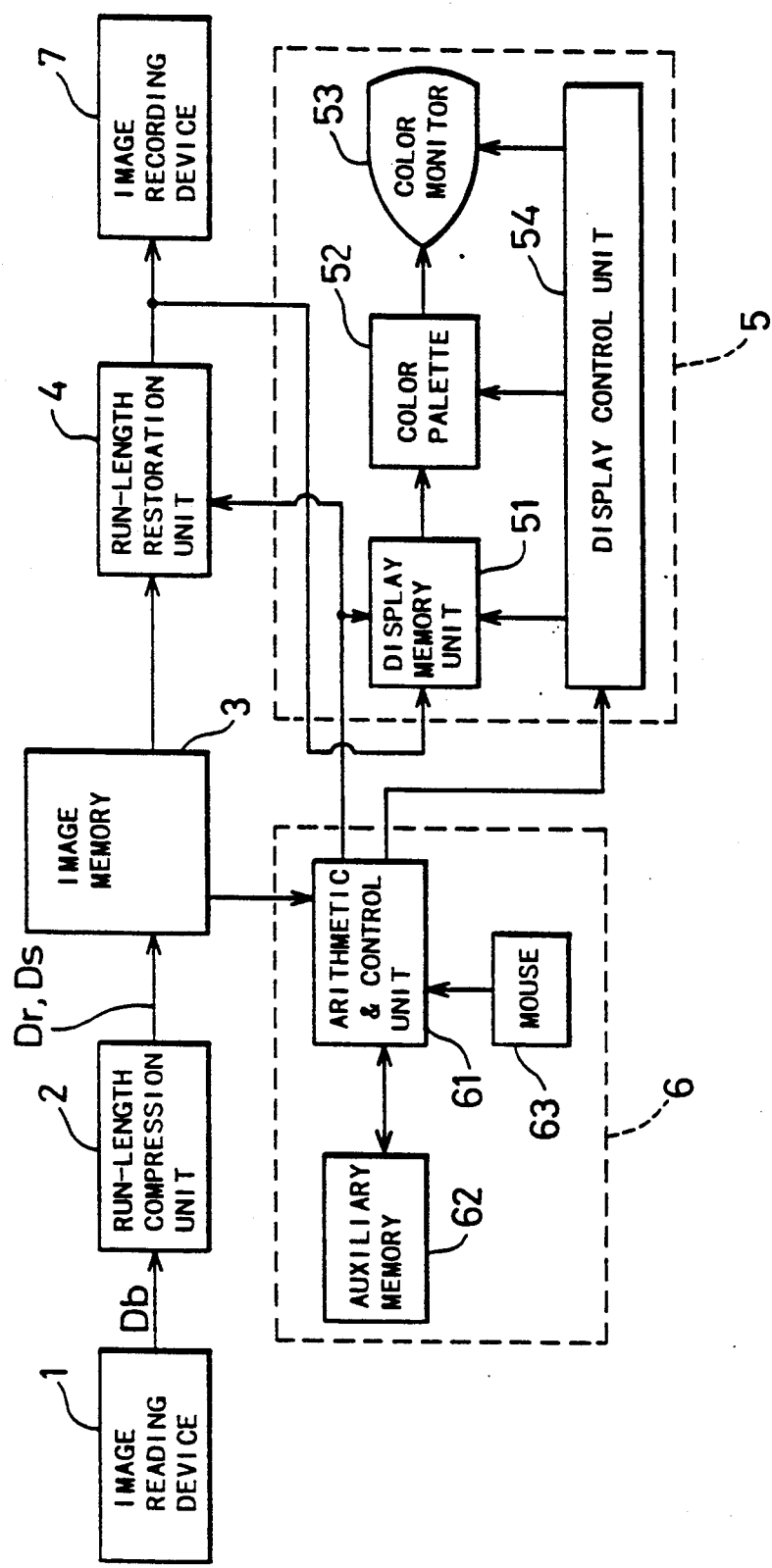
FIG. 1 is a block diagram of an image processor embodying the present invention.

FIG. 1 is a block diagram schematically illustrating the structure of an image processing apparatus for eliminating pin holes in an image embodying the present invention. The image processing apparatus includes the following elements:

(a) Image reading device 1: reading a block copy image to obtain binary image data. The image reader 1 is a flat-bed type scanner, for example.

(b) Run-length compression unit 2: compressing the binary image data obtained by the image reading device 1 to produce run-length data.

(c) Image memory 3: storing run-length data supplied from the run-length compression unit 2 and a CPU 6 (described later), including the run-length data after the pin hole elimination process.

(d) Run-length restoration unit 4: restoring run-length data supplied from the image memory 3 to produce bit map data.

(e) Color monitor device 5: displaying a color image as a function of the bit map data supplied from the run-length restoring part 4 and the CPU 6. The monitor device 5 includes:

(e-1) a display memory 51 for storing bit map data of an image to be displayed;

(e-2) a color palette 52 for converting color numbers (specified for each image region of a block copy image) included in image data given by the display memory 51 into brightness signals of R for red, G for green, and B for blue;

(e-3) a color monitor 53 for displaying a color image; and (e-4) a display control unit 54 for controlling the display of an image on the color monitor 53, renewing color data (information showing color numbers and corresponding brightness signals of three primary colors) stored in the color palette 52, and adjusting the position of a display cursor on the color monitor 53 corresponding to the movement of a mouse.

(f) CPU 6: controlling the whole image processor and executes required operations. The CPU 6 includes:

(f-1) an arithmetic and control unit 61 for controlling each part of the image processor and for executing various operations described later, including region segmentation, calculation of areas of separate regions, and comparison of the areas of separate regions and specific pin hole size;

(f-2) an auxiliary memory 62 for storing temporary data required for each process; and (f-3) a mouse 63 usable for specifying a subject region to be processed in an image displayed on the color monitor 53.

(g) Image recording device 7: recording a reproduced image without pin holes onto a recording medium such as a photosensitive film.

B. Processing procedure

Figure 2:
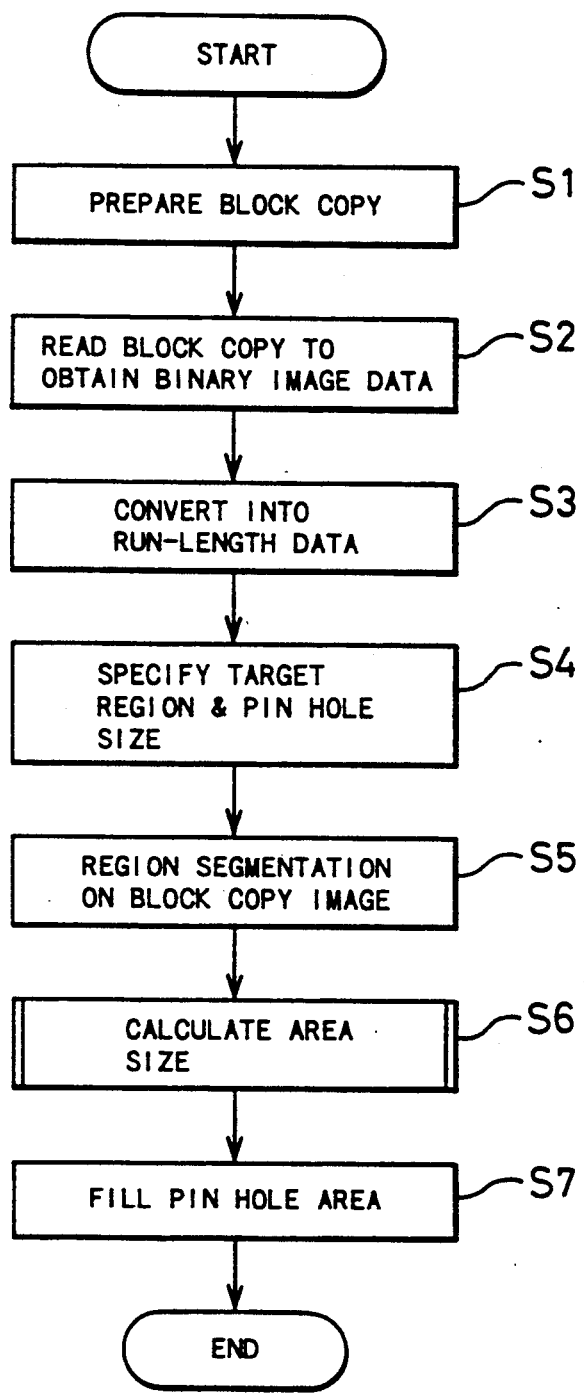
FIG. 2 is a flowchart showing the pin hole elimination process.

FIG. 2 is a flowchart showing the procedure for eliminating pin holes.

Figure 3A:
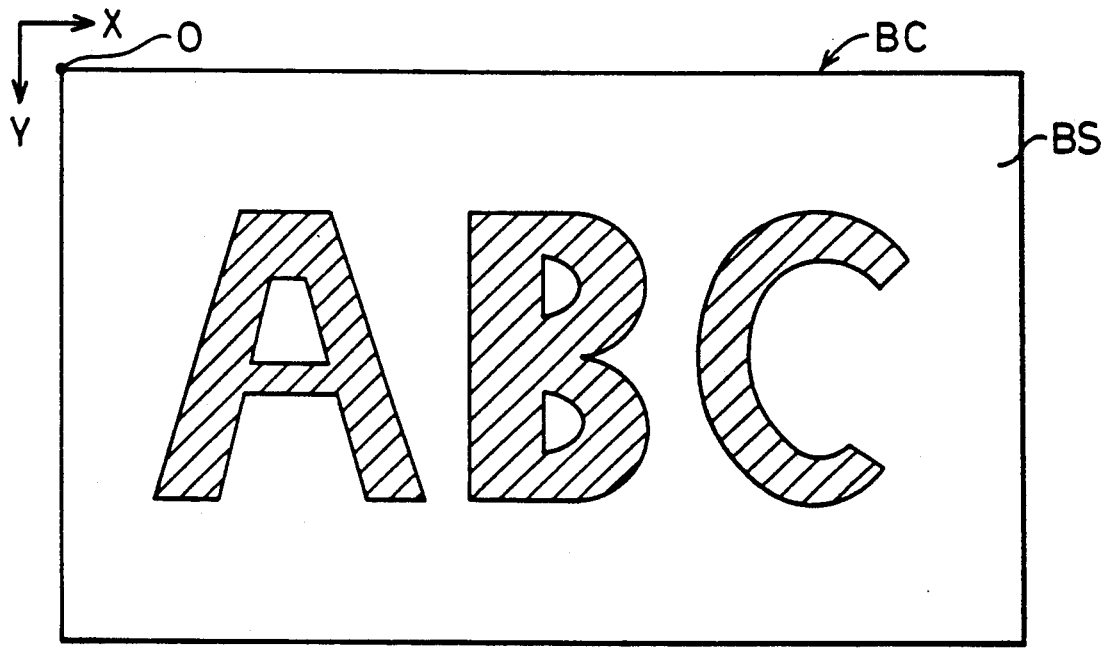
FIG. 3A through 3D are plan views illustrating an image processed in the embodiment.

At step S1, a block copy having characters and plane figures disposed on a base sheet is prepared. FIG. 3A is a plan view of a block copy BC, which includes characters "A", "B", and "C" written in black on a white base sheet BS. A block copy often includes various plane figures as well as characters.

At step S2, binary image data Db of the block copy BC is read by the image reading device 1. The binary image data Db represents the color, black or white, of each pixel in the block copy image.

Figure 3B:
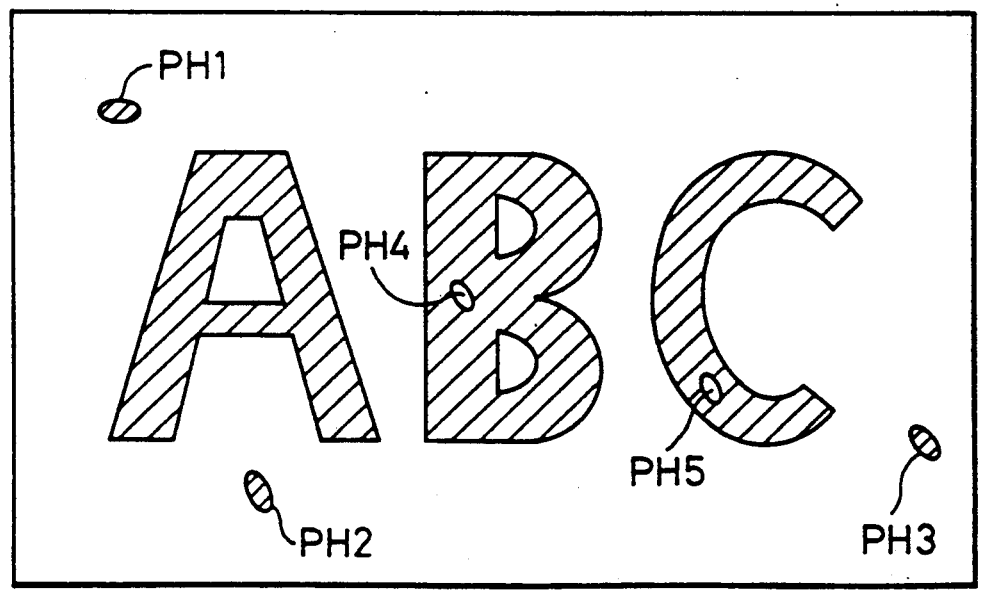

FIG. 3B illustrates an image represented by the binary image data Db. This image includes black pin holes PH1 through PH3 in a white area, and white pin holes PH4 and PH5 in black areas.

Figure 4A:
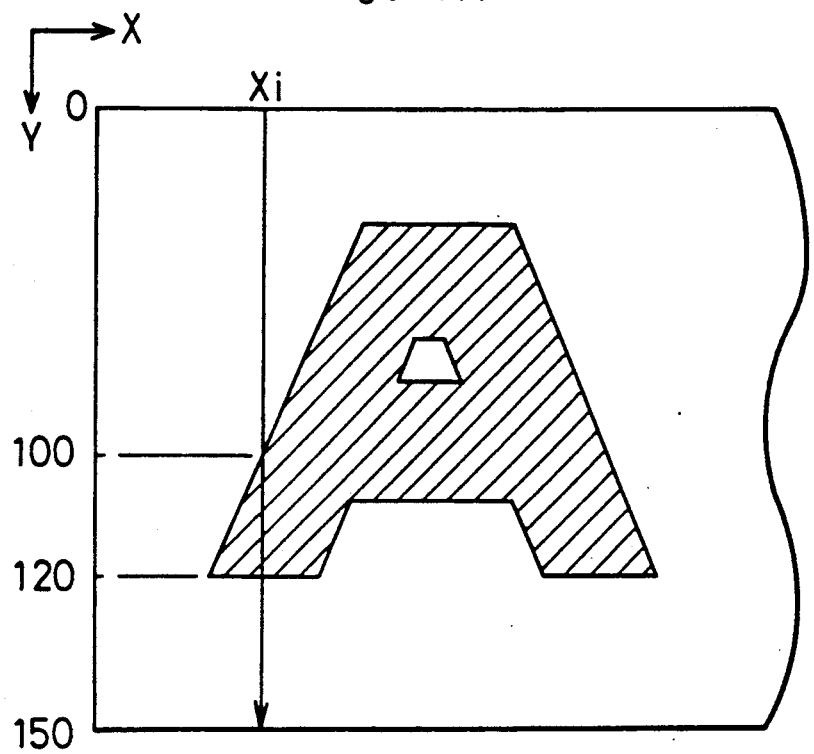
FIGS. 4A through 4C are explanatory views illustrating the structure of run length data Dr.
Figure 4B:
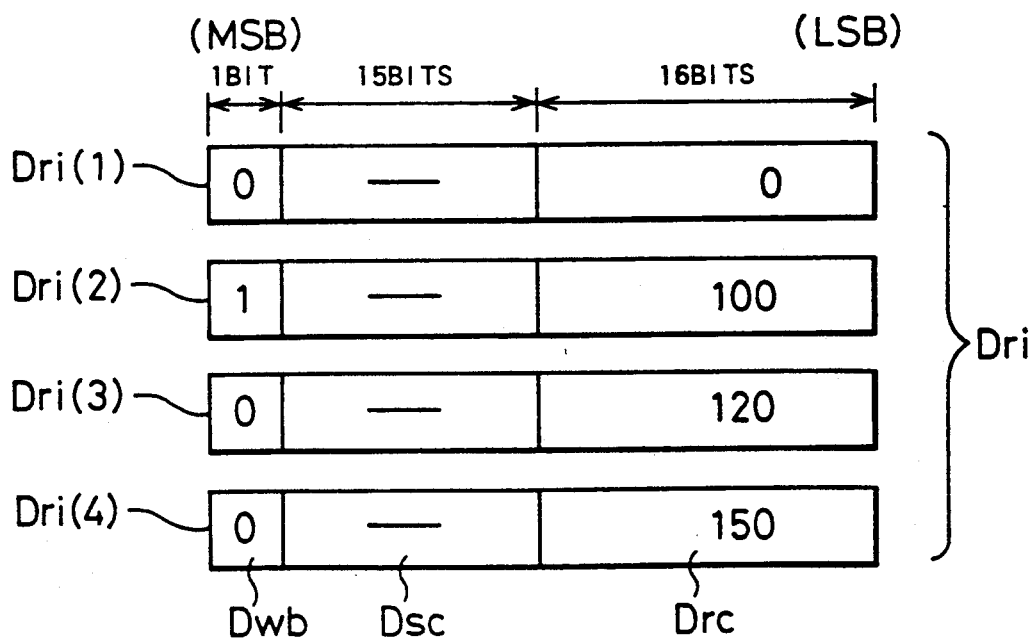

At step S3, the binary image data Db is supplied from the image reading device 1 to the run-length compression unit 2, and is converted into run-length data Dr therein. FIGS. 4A and 4B are explanatory views illustrating the structure of run-length data Dr.

An enlarged character "A" of the block copy image is shown in FIG. 4A with the ordinate of a main scanning direction Y and the abscissa of a subscanning direction X. The ordinate ranges from zero to 150.

FIG. 4B shows the structure of run-length data Dri on the scanning line at the subscanning coordinate Xi. In this FIG. 4B, abbreviation "LSB" is used for least significant bit and abbreviation "MSB" is used for most significant bit. The run-length data Dri includes four consecutive data Dri(1) through Dri(4) (each hereinafter referred to as unit run-length data). Each unit run-length data Dri(1), Dri(2), Dri(3) and Dri(4) consists of thirty two bits; the MSB is a white/black designation data Dwb showing the color, black or white, of the unit run-length data; the next fifteen bits are system color data Dsc showing system color numbers (described later); and the least significant sixteen bits are coordinate data Drc showing the main scanning coordinate of a starting point of the unit run-length data.

As seen in FIG. 4A, the image on the scanning line at the subscanning coordinate Xi, the image is white in a range between 0 and 99 of the main scanning direction Y, black between 100 and 119, and again white between 120 and 150. The three unit run-length data Dri(1) through Dri(3) show the main scanning coordinates of each starting point of the above three ranges and the color, black or white, of the ranges. The last unit run-length data Dri(4) has the maximum main scanning coordinate (=150), which indicates the end of the run-length data for this scanning line. The system color data Dsc in the run-length data does not mean anything at this stage since the system colors are not determined yet.

Figure 4C:
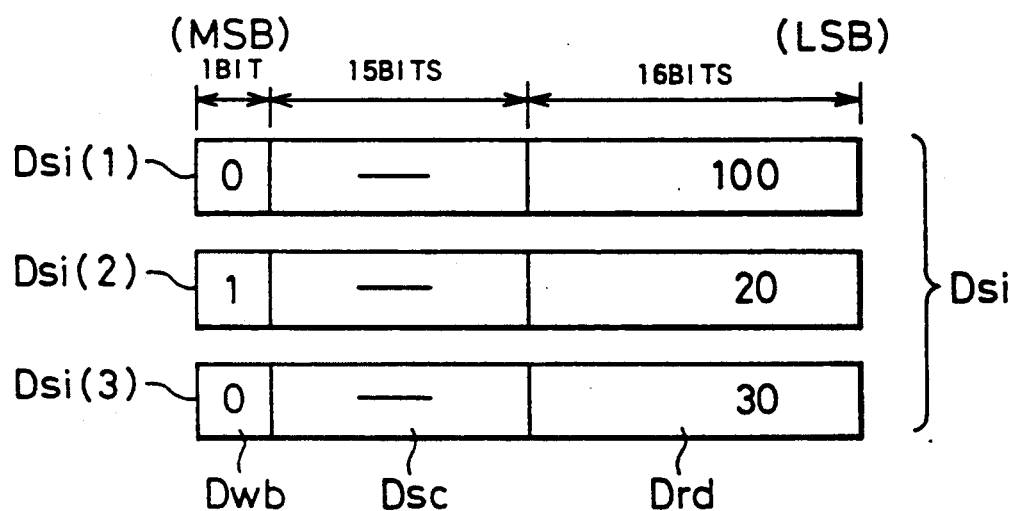

FIG. 4C illustrates another structure of run-length data. This run-length data Dsi includes three consecutive unit run-length data Dsi(1) though Dsi(3). Each unit run-length data Dsi(1), Dsi(2), and Dsi(3) consists of thirty-two bits; the MSB is the white/black designation data Dwb; the next fifteen bits are the system color data Dsc; and the least significant sixteen bits are data Drd indicating a run length, or the number of pixels, of the unit run-length data. The run-length data Dsi shown in FIG. 4C represents the linear image at the subscanning coordinate Xi as the run-length data Dri shown in FIG. 4B. In this specification, the image processing is described based on the run-length data Dsi.

The run-length data Ds thus obtained are supplied from the run-length compression unit 2 to the image memory 3 and stored therein. The block copy image is displayed on the color monitor 53 in black and white based on the run-length data Dr.

Figure 3C:
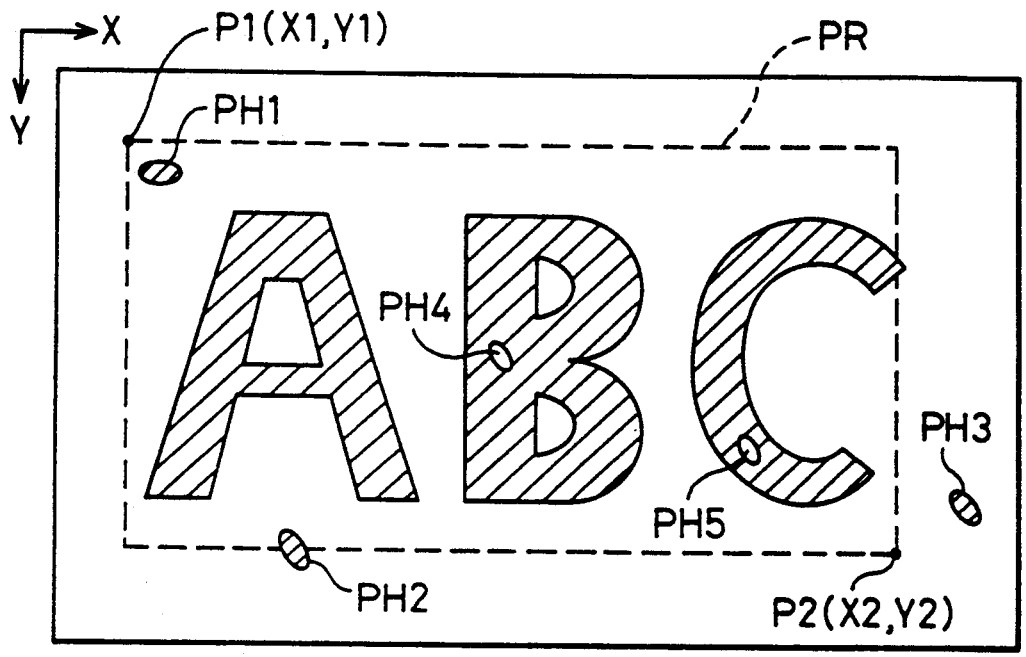

At step S4, the operator specifies a target region PR of pin hole elimination in the block copy image displayed on the color monitor 53. As seen in FIG. 3C, the target region PR is a rectangle defined by parallel lines drawn in the main scanning direction Y and the subscanning direction X from two vertexes PI(X1,Y1) and P2(X2,Y2). The positions of the two vertexes are determined by the operator in the block copy image displayed on the color monitor 53 with the mouse 63. The coordinates of the two vertexes Pi(X1,Y1) and P2(X2,Y2) are stored in the auxiliary memory 62.

An object of defining only part of the block copy image at step S4 is to prevent very small image elements such as agates and delicate portions of a small character from being mistakenly eliminated as pin holes. The operator therefore determines the target region PR not to include those necessary small image elements.

Figure 5:
FIG. 5 illustrates pin hole size.

The operator also specifies a pin hole size by using a key board (not shown) at step S4. The pin hole size denotes a threshold value used for determining whether each image area is eliminated as a pin hole or not. The pin hole size is, as shown in FIG. 5 for example, defined by widths Wx and Wy of a possible pin hole area. The widths Wx and Wy are expressed by the number of pixels, but can be expressed alternatively by a unit of length (for example, centimeters), which is later converted to the number of pixels by the arithmetic and control unit 61.

The arithmetic and control unit 61 multiplies the width Wx by the width Wy to make a product Zp in the unit of the number of pixels. The product Zp is hereinafter referred to as "reference pin hole size".

Incidentally, the reference pin hole size Zp can be directly input at step S4. When the scanning resolution is 2,000 dots per inch, each pixel is a square of 0.0125 mm. The widths Wx and Wy equal to 0.1 mm make the pin hole size Zp equal to sixty four pixels accordingly.

The following steps S5 and S6 are automatically executed by the arithmetic and control unit 61.

At step S5, region segmentation is executed. The whole block copy image is divided into separate regions each separated by a boundary between a black portion and a white portion, and a system color number Ns is allocated to each separate region.

Figure 3D:
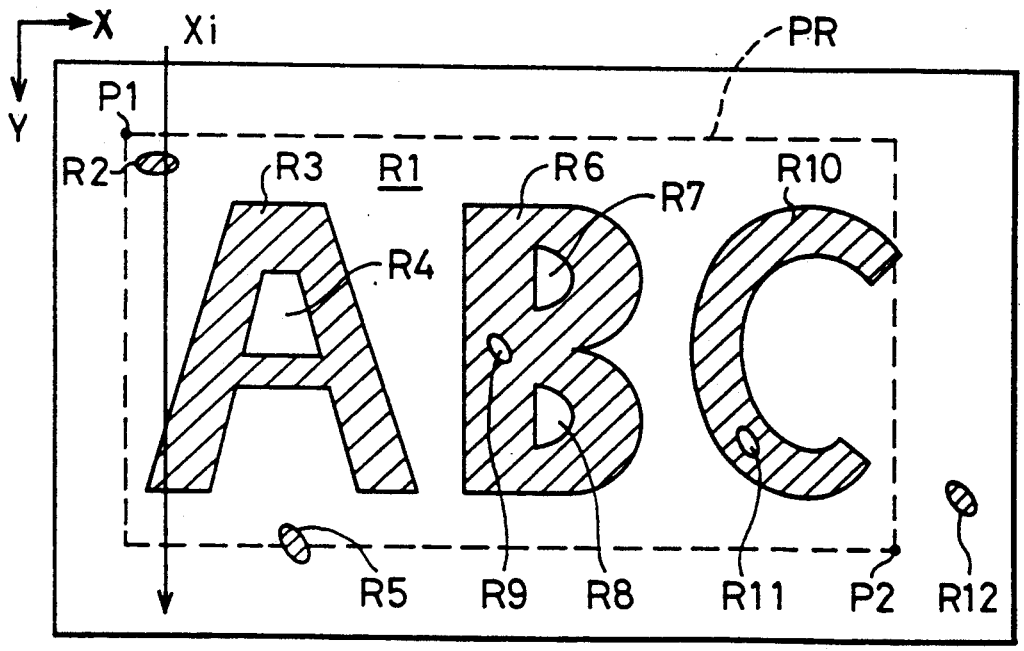

FIG. 3D is an explanatory view showing separate image regions divided at step S5. The block copy image is divided into twelve image regions (hereinafter referred to as separate regions) R1 through R12. Numerals one to twelve are allocated as the system color numbers Ns to the separate regions R1 through R12, respectively. Each system color number Ns is registered as the system color data Dsc of each unit run-length data Dri shown in FIG. 4C.

The number Ns allocated to each separate region is called the system color number because it is automatically given by the arithmetic and control unit 61 and it is usable as a number for representing the color of the image region. Details of this processing are given below. The region segmentation will be described later in detail.

Figure 6A:
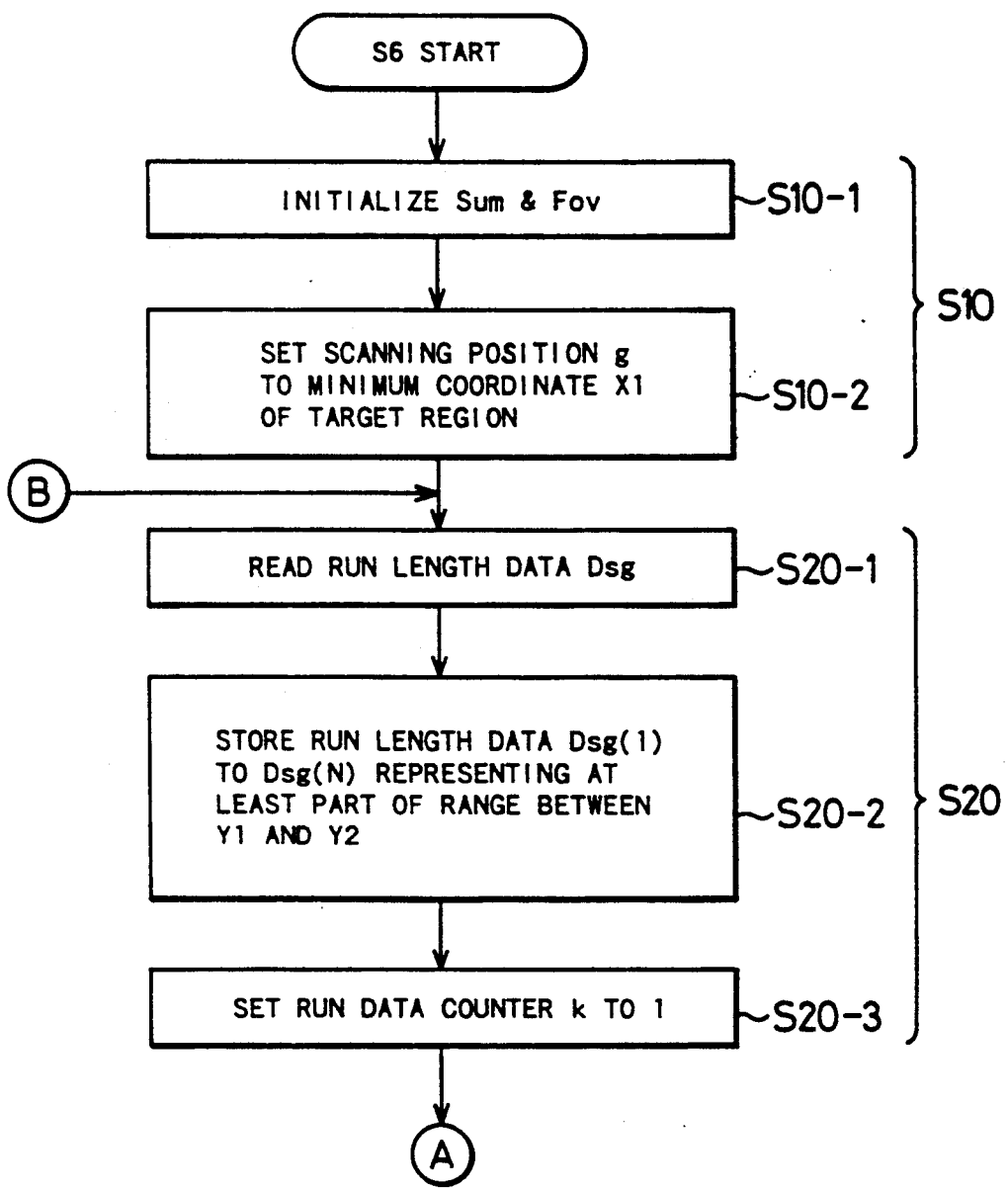
FIGS. 6A and 6B are flowcharts showing details of determination of an area size.
Figure 6B:
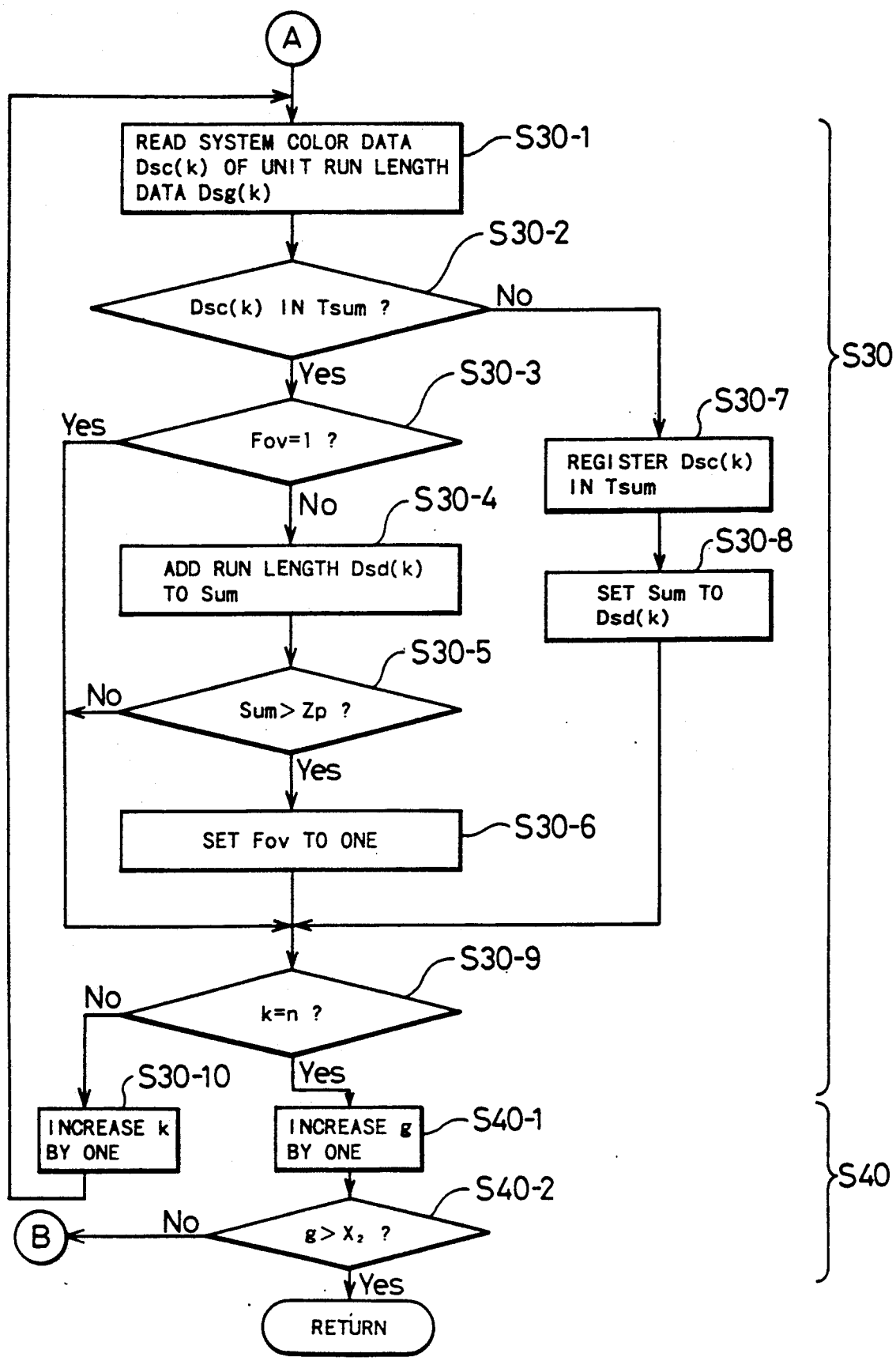

At step S6, the arithmetic and control unit 61 calculates the size of each separate region. FIG. 6 is a flowchart showing details of the processing at step S6, and FIG. 7 is a conceptive view showing a summation table Tsum obtained through the processing.

The summation table Tsum includes a sum of pixels Sum and an overflow flag Fov for each system color data Dsc. The summation table Tsum is stored in the auxiliary memory 62. The sum of pixels Sum, the overflow flag Fov, and other parameters used in processing of FIG. 6 are defined as follows:

Sum of pixels Sum: the number of all the pixels in each separate region;

Overflow flag Fov: a flag given to the separate region having the sum of pixels Sum greater than the reference pin hole size Zp;

Scanning position g: a parameter representing a subscanning position of a target scanning line in summation of pixels; and Run data counter k: a counter representing the order of unit run-length data on a target scanning line.

The above parameters are initialized at the following substeps in step S10 shown in FIG. 6.

At step S10-1, all the values of the sum of pixels Sum and the overflow flag Fov are initialized to zero.

At step S10-2, the scanning position g is set to a minimum coordinate X1 in the subscanning direction X in the target region PR.

Run length data Dsg at the scanning position g in the target region PR is read out of the image memory 3 and stored in the auxiliary memory 62 through the following processes of step S20.

At step S20-1, the run length data Dsg at the scanning position g is selected from image data representing the block copy image stored in the image memory 3. In the embodiment, the type of the run length data shown in FIG. 4C is used in this embodiment.

At step S20-2, unit run length data Dsg(1) through Dsg(n), each representing at least part of the target region PR, are extracted from the run length data Dsg and stored in the auxiliary memory 62. The unit run length data extracted can be over the range between the main scanning coordinates Y1 and Y2, as the run length data representing part of the black pin hole PH2 of FIG. 3C.

In the embodiment, the number of unit run length data Dsg(k), which represents at least part of the target region PR, is assumed to be n.

At step S20-3, the value of the run data counter k is set to one.

The program then proceeds to step S30 (FIG. 6B) including the following substeps S30-1 through S30-10.

At this step S30, the system color data Dsc(k) of each unit run length data Dsg(k) is registered in the summation table Tsum, and the run length thereof is successively added to the sum of pixels Sum. The sum of pixels Sum is compared with the reference pin hole size Zp, and the overflow flag Fov is set according to the comparison.

At step S30-1, the system color data Dsc(k) is read out of the unit run length data Dsg(k) specified by the run data counter k.

At step S30-2, it is judged whether the system color data 5 Dsc(k) read at step S30-1 is already registered in the summation table Tsum.

When the system color data Dsc(k) does not exist in the summation table Tsum, the program proceeds to step S30-7 at which the system color data Dsc(k) is registered in the summation table Tsum. At the following step S30-8, the sum of pixels Sum for the system color data Dsc(k) is set to a run length Dsd(k) of the unit run length data Dsg(k).

When the system color data Dsc(k) exists in the table Tsum at step S30-2, on the other hand, the program proceeds to step S30-3 at which it is judged whether the overflow flag Fov of the system color data Dsc(k) is equal to one.

The overflow flag For is set to one when the sum of pixels Sum(Dsc) exceeds the reference pin hole size Zp described above.

When the overflow flag For is equal to one at step S30-3, the program skips steps S30-4, 5, and 6, and proceeds to step S30-9 described later.

On the other hand, when the overflow flag For is not equal to one but equal to zero, the program proceeds to step S30-4 at which the run length Drg(k) of the unit run length data Dsg(k) is added to the sum of pixels Sum(Dsc) for the system color data Dsc(k).

At step S30-5, the sum of pixels Sum(Dsc) for the system color data Dsc(k) is compared with the reference pin hole size Zp.

When the sum of pixels Sum( Dsc ) is greater than the reference pin hole size Zp, the program executes step S30-6 at which the overflow flag Fov is set to one.

When the sum of pixels Sum(Dsc) is, on the contrary, no more than the reference pin hole size Zp, the program skips step S30-6 to proceed to step S30-9.

At step S30-9, it is judged whether the run data counter k is equal to n.

When the run data counter k is not equal to n, the program proceeds to step S30-10 at which the parameter k is increased by one, and returns to step S30-1 for processing the next unit run length data.

When the parameter k is equal to n, the program proceeds to step S40 because all the necessary processing has been completed for the unit run length data Dsg(1) to Dsg(n) at the current scanning position g.

At step S40-1, the value of the scanning position g is increased by one.

When the value of the scanning position g is not more than a maximum coordinate X2 in the subscanning direction X at step S40-2, the program returns to step S20-1 to execute processing of unit run length data at the new scanning position g.

When the value of the scanning position g is greater than the maximum X2, the program exits the routine of FIG. 6 and concludes the processing of step S6 of FIG. 2.

FIG. 7 shows the summation table Tsum obtained by the above area size calculation for the target region PR shown in FIG. 3C. In the embodiment, the reference pin hole size Zp is set equal to 100 pixels, and the overflow flag Fov is set to zero for the system color data Dsc (=2, 5, 9, and 11) having the sum of pixels of no more than 100. Since the system color data Dsc=1 through 12 are respectively allocated to the separate regions R1 through R12 of FIG. 3D, the overflow flag Fov is set to zero for the separate regions R2, R5, R9 and R11 corresponding to the pin holes PH1, PH2, PH4, and PH5 of FIG. 3C. In other words, the separate regions R2, R5, R9 and R11 with the overflow flag Fov of zero are extracted as pin hole areas.

When the size calculation at step S6 is completed, the program proceeds to step S7 at which the separate regions extracted as the pin hole areas are filled with the color of the surrounding area.

Figure 8:
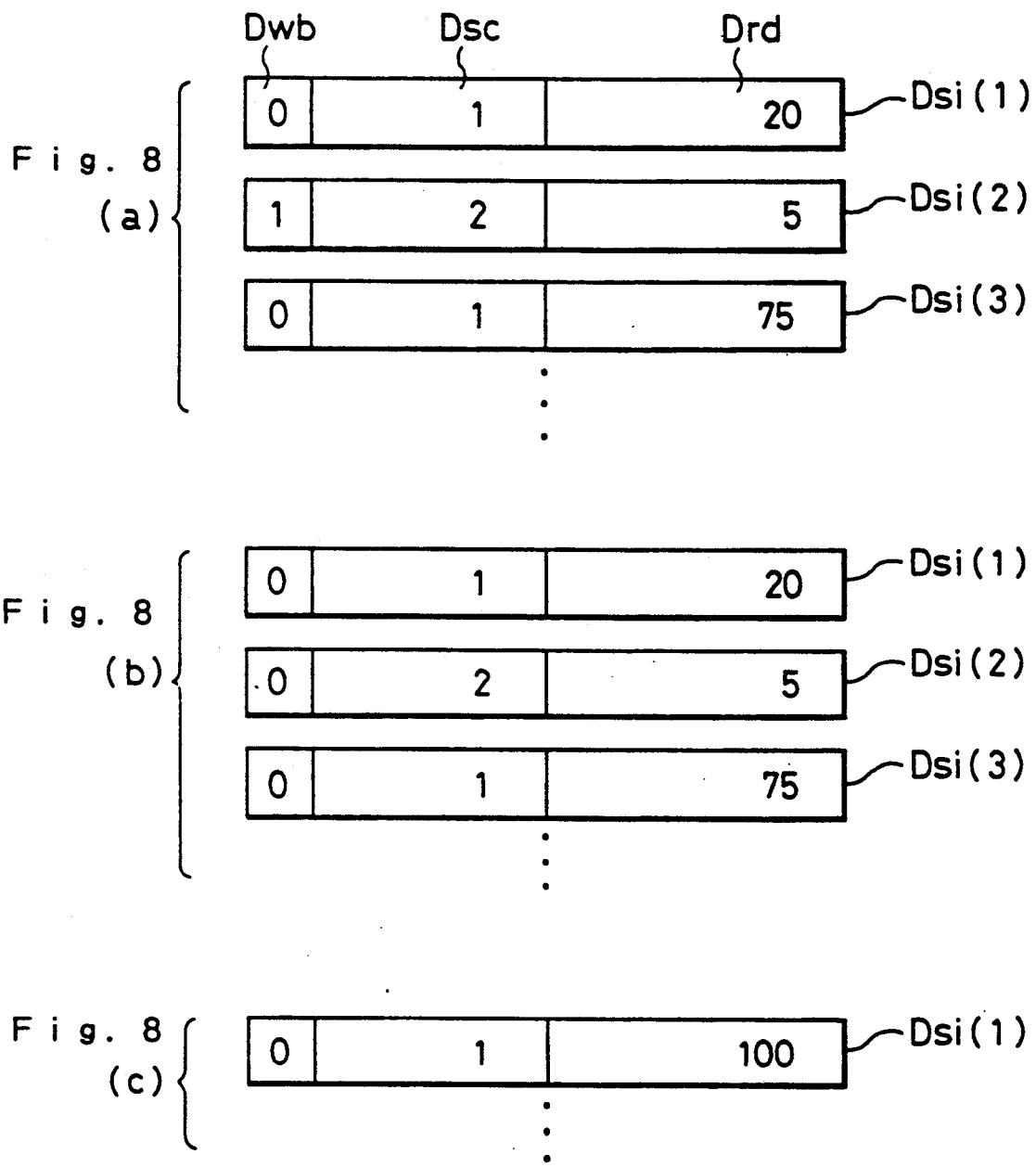
FIGS. 8A–8C are explanatory views showing a process of filling a pin hole area.

FIG. 8 is an explanatory view showing the filling process of step S7, executed for the run length data at the subscanning coordinate Xi of FIG. 3D.

FIG. 8(a) shows the unit run length data Dsi before the filling process, in which the second unit run length data Dsi(2) represents the separate region R2, or the pin hole PH1.

In the filling process, the white/black data Dwb of the unit run length data Dsi(2) which has the system color data Dsc (=2, 5, 9, or 11) corresponding to the pin hole area is substituted by white/black data Dwb of adjacent unit run length data, for example, the unit run length data Dsi(1). The unit run length data Dsi processed in this manner are shown in FIG. 8(b). The adjacent unit run length data Dsi(1) through Dsi(3) with the same value of the white/black data Dwb can be accumulated to one unit run length data Dsi(1) as shown in FIG. 8(c). In the latter case, the system color data of the first or last unit run length data is employed as the system color data Dsc of the accumulated unit run length data Dsi(1).

According to the above embodiment, the number of pixels Sum in each separate region is compared with the reference pin hole size, whereby the separate region not greater than the reference pin hole size is designated as the pin hole area. The designated pin hole areas are filled with the color of the surrounding area to be eliminated. An operator only specifies the target region PR and the reference pin hole size while the CPU 6 automatically executes the following process. Accordingly, the above method eliminates pin holes with ease within a short time period. This method is especially effective and usable for an image including a larger number of small pin holes such as a block copy image read at a resolution of 2,000 dots per inch.

C. Procedure of Region Segmentation

Figure 9:
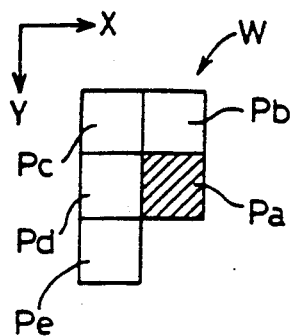
FIG. 9 is a view showing a process window used in region segmentation.

The region segmentation is performed in the following manner, for example. FIG. 9 is a view showing a window W used in the region segmentation process. The shaded pixel Pa is a pixel-to-be-processed, and peripheral pixels Pb through Pe are in contact with the pixel Pa.

The window W is successively moved in the main scanning direction Y in such an order that a scanning line at smaller subscanning coordinate X is scanned earlier. When only the pixel Pa is black and none of the other pixels Pb through Pe is black, a new system color number Ns is allocated to the pixel Pa. On the other hand, when the pixel Pa and any one of the peripheral pixels Pb through Pe are black, the system color number Ns allocated to the black peripheral pixel is given to the pixel Pa as its system color number Ns.

The pixel Pa in white is processed in a similar manner. That is, a new system color number Ns is allocated to the pixel Pa when all of the peripheral pixels are black, and the same system color number Ns is allocated to the pixel Pa as that of a white peripheral pixel when any one of the peripheral pixels is white. But when the target pixel Pa and the pixels Pc and Pe each obliquely in contact with Pa are white, and the other pixels Pb and Pd are black, a different system color number Ns is allocated to the pixel Pa from that of the pixels Pc and Pe. This makes these white pixels only obliquely contacting each other to be separate regions. As a result, a black separate region and a white separate region which obliquely intersect each other are prevented.

While the window W is moved, different system color numbers Ns are successively allocated to independent regions. In such processing, there are some cases that two or more system color numbers Ns are allocated to one region. FIGS. 10A through 10D are explanatory views showing processes in such a case.

Figure 10A:
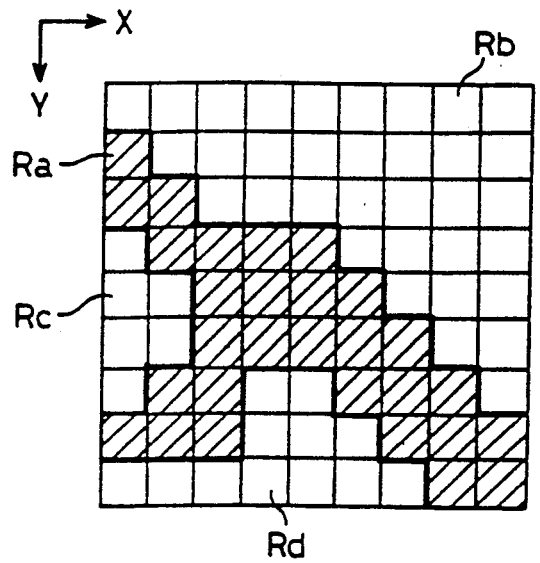

Suppose, as shown in FIG. 10A, a block copy image includes a black region Ra and three independent white regions Rb, Rc, and Rd separated by the region Ra.

While the window W is successively moved in the main scanning direction Y in such an order that a scanning line at smaller subscanning coordinate X is scanned earlier, different system color numbers Ns are allocated to the respective regions Ra through Rd.

Figure 10B:
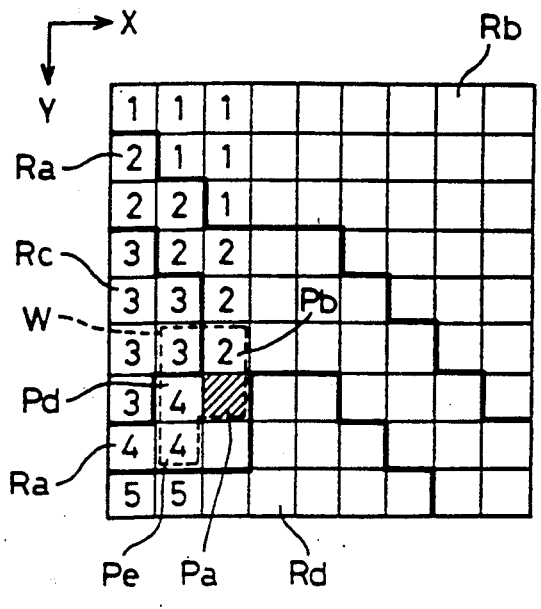

Numerals on pixels denote the system color numbers Ns allocated to the pixels in FIG. 10B. Pixels without numerals do not have the system color numbers Ns yet. As seen in FIG. 10B, the black region Ra includes pixels to which a numeral 2 is allocated as the system color number Ns and those with a numeral 4. When the window is on the position shown in FIG. 10B, the system color number Ns on the pixel Pb in contact with the target pixel Pa is equal to 2, and those on the peripheral pixels Pd and Pe are equal to 4. Information representing that $Ns=2$ and $Ns=4$ denote the same system color is temporarily stored in the auxiliary memory 62, and the smaller system color number $Ns=2$ is allocated to the target pixel Pa. FIG. 10C shows a system color image or an image filled with respective system colors, and FIG. 11 shows an identical system color table IST, both obtained as a result of such processing for all the pixels of FIG. 10A.

The table IST indicates that the system color numbers $Ns=2$ and $Ns=4$ denote an identical system color; that is, they are allocated to the same image region. The table IST also indicates that the numbers $Ns=5$ and $Ns=6$ also denote an identical system color. The table IST is stored in the auxiliary memory 62.

The arithmetic and control unit 61 then reallocates a common system color number (for example, the smallest system color number) to pixels with different system color numbers in the same image region for the image of FIG. 10C based on the table IST. The result of such processing is shown as an image of FIG. 10D, in which each of the regions Ra through Rd has one system color number Ns which is different from those of the other regions.

Although processing of pixel image data is described above, run-length image data of FIG. 4A and 4B can be processed in the similar manner.

In processing of run-length image data, run-length data of two scanning lines adjacent to each other are read. The left peripheral pixels Pc, Pd, and Pe on the window W of FIG. 9 exist on the first scanning line closer to the origin of the coordinates, and the peripheral pixel Pb and the target pixel Pa are on the second scanning line.

The run-length data for the two scanning lines are simultaneously examined. When the boundary of separate regions or separate run-lengths is located between the pixels Pc and Pd or Pd and Pe, the color of the target pixel Pa is compared with those of the peripheral pixels Pb through Pe in the same manner as above. A system color number Ns is accordingly allocated to the target pixel Pa. When the boundary of separate regions is located between the peripheral pixel Pb and the target pixel Pa on the second scanning line, a system color number Ns is allocated to the target pixel Pa in a similar manner.

Region segmentation is thus executed by allocating system color numbers Ns to the pixels in the image on the basis of run-length data while the run-length data on the two adjacent scanning lines are compared with each other.

The processing above divides the subject region PR into the separate regions R1 through R12 and allocates a common system color number Ns to the pixels in each separate region. The system color numbers Ns are registered as system color data Dsc in each unit run-length data.

Figure 12:
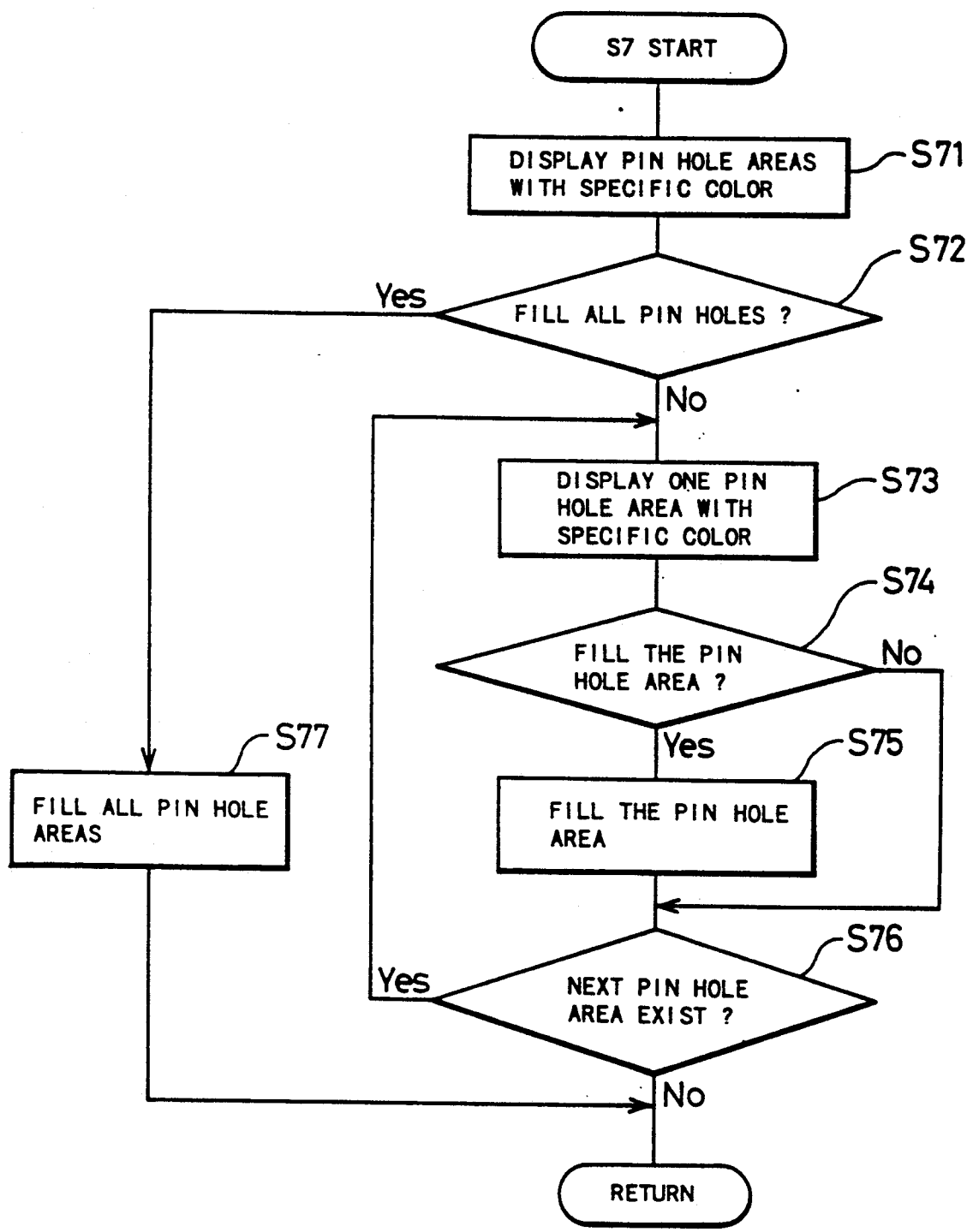
FIG. 12 is a flowchart showing another example of the process of filling a pin hole area.

D. Modification (1) At step S7 of FIG. 2, all the separate regions extracted as pin hole areas at step S6 are filled with the colors of the surrounding areas. Alternatively, only some areas selected out of the pin hole areas by the operator may be filled at step S7. FIG. 12 is a flowchart showing the process of step S7 in this manner.

At step S71, all the possible pin hole areas extracted at step S6 are filled with a specific color and the block copy image including the filled pin holes is displayed on the color monitor 53. The specific color is a color (for example, red) specified by the operator to be distinguishable from the colors (white and black) of the other areas in the block copy image.

At step S72, a question to the operator is displayed on the color monitor 53, which asks whether all the possible pin hole areas filled with the specific color are to be refilled with the colors of their surrounding areas. The operator selects either 'YES' or 'NO' with the mouse 63 or the key board (not shown).

When the answer is 'YES' at step S72, the program proceeds to step S77 at which all the possible pin hole areas are filled with the colors of their surrounding areas.

When the answer is 'NO' at step S72, on the other hand, one possible pin hole area filled with the specific color is selectively displayed (step S73); the operator determines whether the displayed possible pin hole area is to be filled or not (step S74); and the possible pin hole area selected at step S74 is refilled with the color of its surrounding area (step S75). When it is judged that another possible pin hole area exists at step S76, the program returns to step S72 and steps S73 through S76 are repeated. In this manner, the pin hole areas are filled with the colors of surrounding areas one by one.

In the process of FIG. 12, each separate region extracted as a possible pin hole area is filled with the specific color, and the operator instructs whether or not to eliminate the possible pin hole area one by one. This step prevents an essential image element like a delicate portion of a small character, which is mistakenly designated as the pin hole area, from being filled with the color of its surrounding area to be eliminated.

(2) In the embodiment, the system color data Dsc is registered in the summation table Tsum each time new data Dsc is detected as shown by steps S30-2, S30-7, and S30-8 of FIG. 6. A memory region of the summation table Tsum for storing all system color data Dsc can be established previously in the auxiliary memory 62 as follows.

When the system color data Dsc is a 15-bit data as seen in FIGS. 4A through 4C, the sum/nation table Tsum requires a space for the sums of pixels Sum and the overflow flags Fov for $2^{15}$ (=32,768) pieces of system color data. A memory region of the summation table Tsum accordingly has a size of 32,768 words (one word=16 bits), and each system color number is allocated to an address starting from the top of the memory region. One bit out of the sixteen bits of each word is allocated to the overflow flag Fov, and the other fifteen bits to the sum of pixels Sum.

This method can omit steps S30-2, S30-7, and S30-8 of FIG. 6. For example, when the system color data Dsc=2478 is read out at step S30-1, the one word data at the 2478th address in the summation table Tsum represents the sum of pixels Sum and the overflow flag Fov for the system color data. The one word data therefore is read out at step S30-1, and steps S30-3, 4, 5, and 6 are executed while step S30-2 is skipped.

When a memory region for all system color data is previously defined in the summation table Tsum, data corresponding to each system color data is read out at a high speed.

(3) Although the above embodiment specifies only one target region PR in the block copy image, plural target regions can be specified at step S4 of FIG. 2, and steps S6 and S7 can be successively executed for each target region.

The target region is specified for excluding very small image elements like agates and complicated or delicate portions of small characters from the target region, as described before. The pin hole elimination can, however, be executed for the whole block copy image without specifying the target region. In such a case, each separate region extracted as a possible pin hole area is refilled or non-filled with the color of its surrounding area according to process of FIG. 12. This method allows efficient pin hole elimination without eliminating essential image elements.

The method and apparatus of the present invention, as described above, compares the number of pixels in a given data element to a reference number of pixels representing the maximum pin-hole size. In contrast, as described previously, the method and apparatus of EP 194 689 to Petrick et al. utilizes a window element based on the size of the smallest data item of a bit-map image to scan the image and examines the elements of the outermost ring to determine if they are the same for each pixel in the outer ring. If they are, the data levels interior to the window are set to equal values, thus eliminating the dot or void. Since the present invention and Petrick eliminate pin holes in different ways, they produce different results under certain circumstances.

Figure 13A:
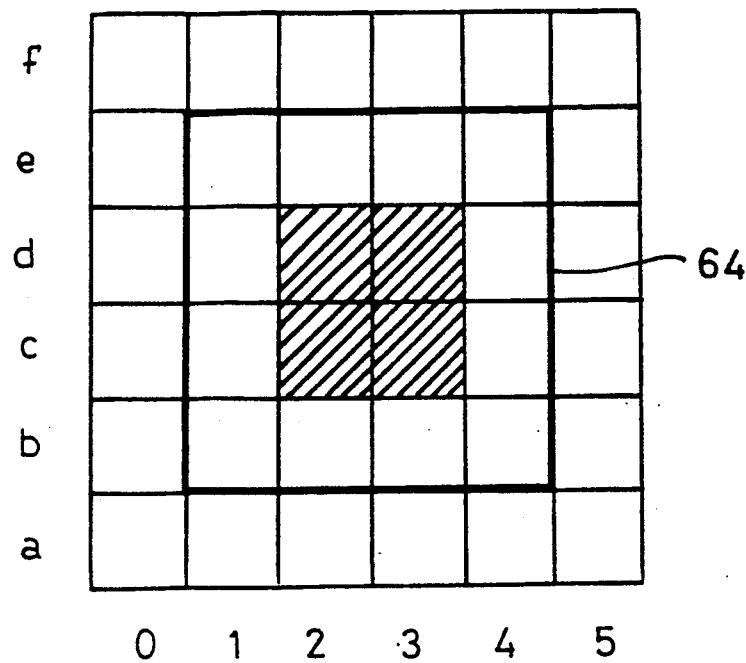
FIGS. 13A and 13B are views representing selection of pixel arrangements showing the difference between the prior art and the present invention in eliminating dots and voids.

For example, FIG. 13A shows four black pixels to be processed. In processing these pixels, Petrick uses a 4×4 pixel window 64, while the present invention utilizes a separate area which has no more than four pixels. The four black pixels c2, c3, d2 and d3 are eliminated, or changed to while, according to Petrick because the outermost pixels of the window have the same data value. These pixels are also eliminated according to the present invention because the number of pixels of the separate area is four. Thus, in this pixel arrangement, the same result is obtained by Petrick and the present invention.

Figure 13B:
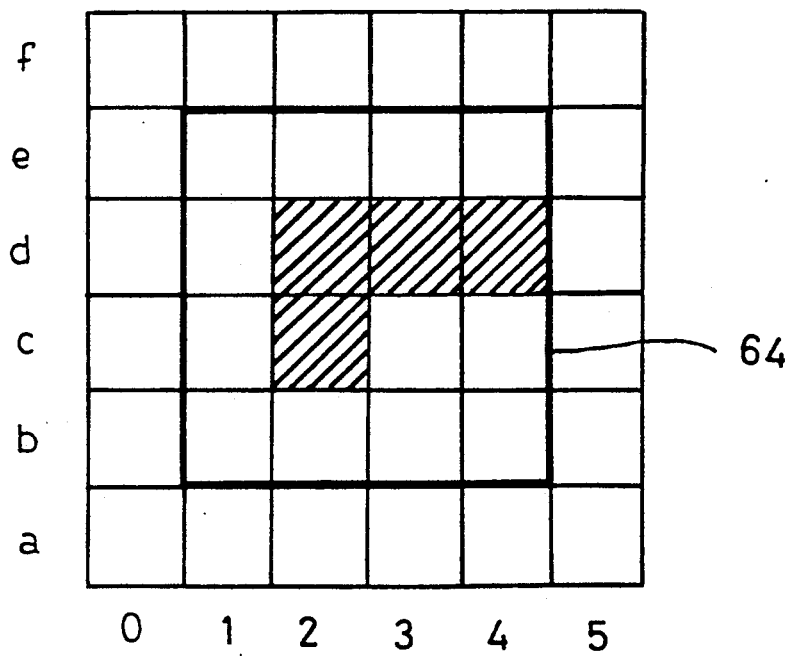

Referring now to the pixel arrangement shown in FIG. 13B, the four black pixels c2, d2, d3 and d4 are not eliminated according to Petrick because the outermost pixels of the window have different data values, while these pixels are eliminated, as they should be, according to the present invention. Thus, the present invention advantageously obtains better results than the prior art with a simpler method and apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of eliminating a pin hole in a linework image by processing image data of the linework image, comprising the steps of:
   (a) specifying a pin hole size;
   (b) dividing the linework image into plural separate regions;
   (c) calculating the size of each separate region;
   (d) comparing the size of each separate region with said pin hole size to find a separate region smaller than said pin hole size as a possible pin hole area; and
   (e) filling said possible pin hole area with a color of a separate region surrounding said possible pin hole area;
   said step (c) comprising the step (c-1) of counting the number of pixels in each separate region.

2. A method in accordance with claim 1, wherein:
   the image data comprises run length data representing the linework image, and
   said step (c-1) comprises the step of accumulating run length of each separate region to obtain said number of pixels.

3. A method in accordance with claim 2, wherein said step (e) comprises the step of:
   (e-1) changing color data in said run length data representing each possible pin hole area to have a value representing said color of the surrounding separate region.

4. A method in accordance with claim 3, further comprising the step of:
   (f) displaying said linework image on a display means, and specifying a subject region to be processed in said linework image displayed on the display means prior to said step (b).

5. A method of eliminating a pin hole in a linework image by processing image data of the linework image, comprising the steps of:
   (a) specifying a pin hole size;
   (b) dividing the linework image into plural separate regions;
   (c) calculating the size of each separate region;
   (d) comparing the size of each separate region with said pin hole size to find a separate region smaller than said pin hole size as a possible pin hole area; and
   (e) filling said possible pin hole area with a color of a separate region surrounding said possible pin hole area;
   said step (e) comprising the steps of:
   (e-1) filling said possible pin hole area with a specific color distinct from colors of the other separate regions, and displaying said linework image on display means;

(e-2) determining whether or not said possible pin hole area is to be filled with the color of the surrounding separate region; and (e-3) filling said possible pin hole area with the color of the surrounding separate region according to the determination at said step (e-2).

6. A method in accordance with claim 5, wherein said step (c) comprises the step of:

(c-1) counting the number of pixels in each separate region.

7. A method in accordance with claim 6, wherein:

the image data comprises run length data representing said linework image, and said step (c-1) comprises the step of accumulating run length of each separate region to obtain said number of pixels.

8. A method in accordance with claim 7, wherein said step (e-3) comprises the step of:

(e-4) changing color data in said run length data representing each possible pin hole area to have a value representing said color of the surrounding separate region.

9. A method in accordance with claim 8, further comprising the step of:

(f) displaying said linework image on a display means, and specifying a subject region to be processed in said linework image displayed on the display means prior to said step (b).

10. An apparatus for eliminating a pin hole in a linework image by processing image data of the linework image, comprising:

display means for displaying said linework image;

input means for specifying a pin hole size;

dividing means for dividing the linework image into plural separate regions;

computation means for calculating the size of each separate region;

comparing means for comparing the size of each separate region with said pin hole size to find a separate region smaller than said pin hole size as a possible pin hole area; and filling means for filling said possible pin hole area with a color of a separate region surrounding said possible pin hole area;

said computation means comprising counting means for counting the number of pixels in each separate region.

11. An apparatus in accordance with claim 10, wherein:

the image data comprises run length data representing the linework image; and said counting means comprises means for accumulating run length of each separate region to obtain said number of pixels.

12. An apparatus in accordance with claim 11, wherein said filling means comprises:

means for changing color data in said run length data representing each possible pin hole area to have a value representing said color of the surrounding separate region.

13. An apparatus in accordance with claim 12, further comprising:

means for specifying a subject region to be processed in said linework image displayed on said display means.

14. An apparatus for eliminating a pin hole in a linework image by processing image data of the linework image, comprising:

display means for displaying said linework image;

input means for specifying a pin hole size;

dividing means for dividing the linework image into plural separate regions;

computation means for calculating the size of each separate region;

comparing means for comparing the size of each separate region with said pin hole size to find a separate region smaller than said pin hole size as a possible pin hole area; and filling means for filling said possible pin hole area with a color of a separate region surrounding said possible pin hole area;

said filling means comprises (a) first means for filling said possible pin hole area with a specific color distinct from colors of the other separate regions, and displaying said linework image on said display means, (b) second means for determining whether or not said possible pin hole area is to be filled with the color of the surrounding separate region, and (c) third means for filling said possible pin hole area with the color of the surrounding separate region according to the determination by said determining means.

15. An apparatus in accordance with claim 14, wherein said computation means comprises:

counting means for counting the number of pixels in each separate region.

16. An apparatus in accordance with claim 15, wherein:

the image data comprises run length data representing said linework image, and said counting means comprises means for accumulating run length of each separate region to obtain said number of pixels.

17. An apparatus in accordance with claim 16, wherein said third means comprises:

means for changing color data in said run length data representing each possible pin hole area to have a value representing said color of the surrounding separate region.

18. An apparatus in accordance with claim 17, further comprising:

means for specifying a subject region to be processed in said linework image displayed on said display means.

* * * * *